United States Patent
Fischer

(10) Patent No.: US 9,857,171 B2
(45) Date of Patent: Jan. 2, 2018

(54) MEASURING PROBE FOR NON-DESTRUCTIVE MEASURING OF THE THICKNESS OF THIN LAYERS

(75) Inventor: Helmut Fischer, Oberaegeri (CH)

(73) Assignee: HELMUT FISCHER GMBH INSTITUT FUER ELEKTRONIK UND MESSTECHNIK, Sindelfingen (DE)

( * ) Notice: Subject to any disclaimer, the term of this patent is extended or adjusted under 35 U.S.C. 154(b) by 203 days.

(21) Appl. No.: 13/066,796

(22) Filed: Apr. 25, 2011

(65) Prior Publication Data

US 2011/0260720 A1    Oct. 27, 2011

(30) Foreign Application Priority Data

Apr. 23, 2010   (DE) .................... 20 2010 006 062 U

(51) Int. Cl.
  *G01R 7/06*   (2006.01)
  *G01B 21/08*  (2006.01)
  *G01B 7/06*   (2006.01)

(52) U.S. Cl.
  CPC ............. *G01B 21/08* (2013.01); *G01B 7/105* (2013.01)

(58) Field of Classification Search
  CPC .......... G01B 21/08; G01B 7/105; G01B 7/06; G01N 21/8806; G01N 29/04; G01N 27/90; G01N 27/904; G01N 29/043; G01N 21/88
  USPC ......... 714/699–726; 324/200, 228–229, 238, 324/754.01–755.11, 754.03; 33/558, 561
  See application file for complete search history.

(56) References Cited

U.S. PATENT DOCUMENTS

| | | | |
|---|---|---|---|
| 2,933,336 A * | 4/1960 | Pritchard et al. ............... 403/75 |
| 5,831,430 A | 11/1998 | Pfanstiehl et al. | |
| 6,388,842 B1 * | 5/2002 | Murphy ..................... 360/244.8 |
| 6,583,640 B2 * | 6/2003 | Eriguchi ................ H01L 22/34 |
| | | | 324/762.1 |
| 7,309,981 B2 * | 12/2007 | Yamashita ......... G01R 31/2851 |
| | | | 324/750.03 |
| 2001/0024119 A1 * | 9/2001 | Stockford .................. 324/158.1 |
| 2002/0021125 A1 * | 2/2002 | Fischer ........................ 324/229 |
| 2002/0024351 A1 * | 2/2002 | Eriguchi ................ H01L 22/34 |
| | | | 324/762.1 |

(Continued)

FOREIGN PATENT DOCUMENTS

| DE | 2750017 A1 | 8/1979 |
|---|---|---|
| DE | 10 2005 054 593 A1 | 5/2007 |

(Continued)

OTHER PUBLICATIONS

European Search Report dated Jul. 21, 2015, for corresponding European Patent Application No. EP11162546.3, filed Apr. 15, 2011.

*Primary Examiner* — Alesa Allgood
*Assistant Examiner* — Brent J Andrews
(74) *Attorney, Agent, or Firm* — Kriegsman & Kriegsman

(57) ABSTRACT

The invention relates to a measuring probe for non-destructive measuring of the thickness of thin layers on an object with a measuring head, which comprises at least one sensor element for contact on a measurement surface of an object, and with a support device for receiving the measuring head, which is at least partly surrounded by a housing, wherein at least one further measuring head, which is adjacent to and separated from the first measuring head, is arranged on the support device, which can be controlled independently of the first measuring head.

21 Claims, 5 Drawing Sheets

(56) References Cited

U.S. PATENT DOCUMENTS

Figure 1:
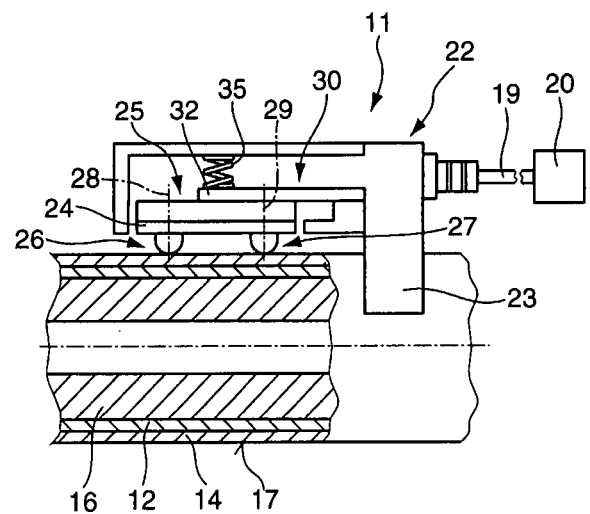

| | | | |
|---|---|---|---|
| 2006/0227342 A1* | 10/2006 | Wolf | 356/630 |
| 2007/0186434 A1* | 8/2007 | Fischer | G01B 7/105 33/834 |
| 2007/0247639 A1* | 10/2007 | Amstel et al. | 356/601 |
| 2010/0097057 A1* | 4/2010 | Karpen | 324/238 |
| 2010/0134879 A1* | 6/2010 | Yoshihara et al. | 359/361 |

FOREIGN PATENT DOCUMENTS

| | | | |
|---|---|---|---|
| EP | 0576714 A1 | | 1/1994 |
| JP | 60138402 A | * | 7/1985 |
| JP | S60138402 A | | 7/1985 |

\* cited by examiner

MEASURING PROBE FOR NON-DESTRUCTIVE MEASURING OF THE THICKNESS OF THIN LAYERS

The invention relates to a measuring probe for non-destructive measuring of the thickness of thin layers on objects.

In DE 10 2005 054 593 A1, a measuring probe for non-destructive measuring of the thickness of thin layers is known, which comprises at least one sensor element in a housing. A contact spherical cap is assigned to this sensor element, so that the measuring probe can be placed, by means of this contact spherical cap, on the surface of a coating to be measured. Subsequently, non-destructive measuring of the film thickness can be carried out with a measuring probe of this type. In general, measuring probes of this type are manually placed on the measurement surface for carrying out measurements. Use of a measuring stand can also be intended. In the process, sufficient accessibility to the measurement surface should be given, in order to be able to place a measuring probe of this type.

Due to increasing quality requirements on one hand, and increasing complexity of measurements, particularly for multiple coatings, on the other hand, it is necessary to further develop measuring probes of this type.

The object of the invention is to create a measuring probe, through which multiple coatings on objects can be checked in a simple and secure way, with the measuring heads being optimised for the measuring process to be used in each case.

This object is achieved according to the invention by a measuring probe according to the features of claim 1. Further preferred embodiments and further developments are given in the further claims.

The measuring probe according to the invention comprises at least a first measuring head on a support device, adjacent to and separated from a first measuring head, which can be controlled independently of the first measuring head. Due to this adjacent and spatially separated arrangement of the first and at least one further measuring head on a support device, the respective measuring heads can be formed independently of each other and in an optimised way, in order to form an optimised and isolated measuring system together with a control in each case. This measuring probe has the advantage, therefore, that after the single contact on a measurement surface to be checked, separate measuring of the thickness of thin layers is made possible by means of the first and at least one further measuring head in each case. Due to the arrangement of the first and at least one further measuring head on the support device, and the disposition of the measuring heads on the measuring surface relative to one another in a predetermined position to each other and to the object, measurements can be carried out with the same or different measuring processes, in order to evaluate the recorded data in an evaluation device corresponding to the measuring task. Therefore, a multiple coating can be checked in a simple and secure way, in particular, with a measuring process being selected for the respective coating, and an optimised measuring head being used on the support device.

A preferred configuration of the invention intends that the respective polar axes of the measuring heads have a spatially separated arrangement, and are preferably oriented parallel to each other. This arrangement of the measuring heads on the support device facilitates a spatially separated arrangement of the measuring heads on the support device, and thus a freedom of arrangement in the spatial dimensioning of the respective measuring head, depending on the respective measuring process to be carried out, in order to carry out qualitatively improved measuring.

A further preferred configuration of the invention intends that at least the first measuring head determines at least one sensor element for measuring the layer thickness according to a magnetic induction process, eddy current method, phase-sensitive process or magnetic DC field process, and the at least one further measuring head determines at least one sensor element for measuring the layer thickness according to one of the above-named measuring procedures. Depending on the measuring task, in particular depending on the base material of an object to be measured, as well as the coatings applied thereon, the individual measuring processes can be selected, and combined with each other, and the measuring heads can be arranged accordingly on the support device.

A further preferred configuration of the measuring probe provides a mounting suspension between the housing of the measuring probe and the support device, so that the support device is slotted into the housing in such a way that it is moveable with at least one degree of freedom. During contact of the measuring probe on the measurement surface, an independent orientation of the support device on the measurement surface is made possible by this arrangement, so that the at least two measuring heads lie equally, and in a tilted contact position of the measuring probe, if necessary, independent orientation takes place with subsequent fitting of the measuring heads. Therefore, both level and curved measurement surfaces can be securely checked, and the handling of the measuring probe can be made easier.

A further preferred configuration of the invention intends that at least two measuring heads are arranged one behind the other in a line on one support device, and a mounting suspension preferably engages on the support device at the centre of gravity of the two-point or multi-point support formed in this way. Through this arrangement, in particular, independent orientation of the measuring heads is made possible and is ensured during contact, so that the measuring heads rest after the positioning of the measuring probe relative to the object to be measured. Due to the preferable arrangement of a mounting suspension at the centre of gravity between the two-point support formed by the measuring heads, an optimised orientation is facilitated.

An alternative configuration of the measuring probe provides two measuring heads and an auxiliary pole on the support device, which form a three-point support, and a mounting suspension preferably engages on the support device at the centre of gravity of the three-point support. This arrangement facilitates independent orientation on both level and curved surfaces due to the three-point support. Preferably, two measuring heads deviating from each other and one auxiliary pole are provided in order to check a multiple coating. Alternatively, two identical measuring heads can be provided with one auxiliary pole. For independent orientation and complete support of the measuring heads and the auxiliary pole on the measurement surface, the mounting suspension preferably engages at the centre of gravity of the three-point support on the support device, whereby a maximal tumbling motion for independent orientation of the support device relative to the measurement surface is given by the measuring heads or the auxiliary pole.

According to a further preferred configuration of the invention, at least one positioning device is provided on a housing, which receives the support device. This positioning device can be provided both in a measuring system with a two-point support as well as in a measuring system with a three-point support. This facilitates a simpler positioning of the housing relative to the measuring object, and a first orientation of the housing relative to the measurement surface, in order to establish targeted contact of the measuring heads on the measuring point.

A further preferred configuration of the invention intends that in a measuring system, at least two measuring heads for measuring layers are oriented in a line along a surface line of the curved surface. The positioning device, which is preferably formed as a prism, is oriented at right angles to both measuring heads in this process. Therefore, an orientation of the measuring heads, and measuring along a surface line, can be effected, so that the same measuring conditions apply for both measuring heads. Whilst measuring the thickness of thin layers, errors resulting from the curvature can therefore already be eliminated by the arrangement of the measuring heads relative to the measurement surface.

According to a first embodiment of the invention, it is intended that the mounting suspension, which connects the support device to the housing, is formed as a ball joint. A ball joint of this type facilitates a three dimensional change of the position of the support device relative to the housing. Therefore, there can be a very flexible adaptation of the position of the measuring heads in relation to the measurement surface.

A further alternative embodiment of the invention intends that the mounting suspension, which connects the support device to the housing, is formed by a spring element or by several strip-like, particularly flat strip-like, spring elements, which engage on the support device and can be attached to housing on the opposite side by a connecting element. This arrangement has the advantage that the strip-like spring element or spring elements, which are arranged next to each other, provide at least a low pressing force on the at least one measuring head during contact of the measuring probe on the surface to be checked, in order to ensure its securing contact on the measurement surface. In addition, at least a slight twisting about the longitudinal axis of the spring elements or single spring element is simultaneously facilitated by the spring element or the strip-like spring elements arranged next to each other. This arrangement has the advantage that a frictionless support of the measuring heads is given with regard to deflection and pivotability in relation to the housing. The strip-like spring elements are preferably held and connected by a connecting element, which can be attached to the housing in a simple way. Therefore a simple mounting and demounting can take place in relation to the housing. In addition, simple contacting with connecting lines or signal lines can take place on the housing by means of the connecting element.

An alternative configuration of the mounting suspension intends that a spring element is designed in a leaf-like manner, and preferably that the measuring heads are oriented with their polar axes standing perpendicularly to the level of the spring element. According to a first alternative, in particular, several electrical conducting paths can be provided on the spring element. A simple and constructive embodiment can therefore be created, with the energy supply of the measuring heads being simultaneously facilitated by the spring element. Therefore, no additional signal lines are required, which can interfere with the orientation of the measuring heads in relation to the measurement surface. This one leaf-like spring element can also comprise one or several recesses, so that an anti-twist device can be adjusted about the longitudinal axis. According to a further alternative, separate signal lines can also lead to the measuring heads.

A preferred configuration of this alternative embodiment intends that the spring elements are arranged next to each other in a common level, and are at a distance from each other, and the measuring heads are preferably oriented with their polar axes standing perpendicularly to the level of the spring element. Through this, the radial deflection of the support device to the longitudinal axis can be determined by the distance of the spring elements, as well as by the cross-sectional geometry of the spring elements. Simultaneously, a deflection in the direction of contact can take place, and the spring force can be particularly increased in the direction of contact. The ends of the spring elements, which are oriented towards the support device, preferably engage at the centre of gravity in the region of the centre of gravity of the two-point or three-point support. A correctly positioned arrangement and orientation of the measuring heads on the measurement surface to be checked can therefore be ensured.

A further alternative embodiment of the mounting suspension intends that this is formed as a cardanic device. Therefore, a targeted deflection or deflection direction of the support device, or the measuring heads arranged thereon, can be achieved in a simple way during contact on the measurement surfaces.

A preferred configuration of the mounting suspension as a cardanic device intends that this consists of a support bar, which can be connected to the housing, and which can deflect in the direction of contact of the measuring heads, in particular, and one or several spring elements particularly arranged on the free end of the support bar, which receive the support device with the at least two measuring heads. This mass-reduced arrangement also allows secure orientation and contact of the measuring heads on the measurement surface. It only effects the dead weight of the measuring heads and a pressing force of the support bar on the measuring heads. Therefore, a coating of the measurement surface can be strongly reduced during contact.

A preferred embodiment of the cardanic device intends that the spring element or spring elements receive the support device pivotally about an axis at right angles to the longitudinal extension of the support bar for secure contact of the at least two measuring heads. Therefore, it can be achieved that in contact of only one measuring head, first of all, independently while the other contact movement of the measuring probe is being carried out, the other measuring head automatically orients itself and also lies securely on the measurement surface.

Furthermore, the strip-like spring elements are preferably electrically conductive. This allows the spring elements to take on a double function, and no additional electrical lines are necessary. A probe unit, which is considerably reduced in mass, can therefore be created, and further disruptive force influences by separate signal lines, which have a negative effect on the measuring, can be eliminated. It is preferably intended that strip-like spring elements, corresponding to the required number of electrical connections, are arranged in a level, so that each spring element almost corresponds to an electrical line for the measuring heads. Alternatively, two, three etc lines can be arranged on one spring element, with this being produced by etching, for example, or in the form of a flexible circuit board.

A further preferred configuration of the mounting suspension intends that there is at least one spring element between the support device on a coupling element, which is preferably oriented at right angles to the support device, and that at least two spring elements, which are spaced at a distance from each other and oriented in parallel, carry the coupling element in such a way that it can be deflected relative to the housing or a housing plate in the direction of contact. An arrangement of this type has the advantage that the at least one spring element arranged between the coupling element and the support device permits a pivoting deflection of the support device during a contact movement, whilst the other spring elements, which are arranged parallel to each other, arranged between the coupling element and the housing or the housing plate, effect a deflection in and against the direction of contact of the measuring heads. In the process, a type of parallelogram guide and deflection is preferably given between the coupling element and the housing or the housing plate. Thus the support device is in turn positioned so that it is moveable with at least one degree of freedom, so that independent orientation and secure contact of the measuring heads of the support device is facilitated.

A further preferred configuration of the above-named mounting suspension intends that the at least one spring element between the support plate and the coupling element is oriented at right angles or parallel to the support device, and is attached thereto. Both embodiments facilitate a pivoting movement of the support device at least with one degree of freedom.

A further alternative embodiment of the measuring probe intends that the support device can be inserted in the housing, particularly removably, and the spring elements are preferably arranged freely outside of the housing. Therefore, in particular embodiments, a housing can be designed which at least partly surrounds the support device, which is arranged separated from a further housing, which comprises a positioning device in particular. This arrangement is particularly advantageous when the open spaces available for measuring are small, so that only one measuring probe can be passed through with a low construction volume to the measurement surface.

Furthermore, an energy storage element is preferably arranged between the support device and the housing, which positions the measuring heads to be dipped in relation to the housing. Therefore, protection for the at least one measuring head can be achieved in the event of too much force being applied. Furthermore, simultaneous resting of all measuring heads can therefore be ensured. The energy storage element preferably engages at the centre of gravity of the support device.

A further preferred configuration of the measuring probe intends that the at least two measuring poles can be controlled sequentially whilst maintaining their contact position. Therefore, the measured values recorded in each case can be directly compared, or also compared in relation to each other, particularly for calculating the difference of the detected layer thicknesses or distances of the measurement surfaces to the layers or to the base material, since the measurement conditions are equal, and the measurement position is defined.

A further preferred configuration of the invention intends that a stop is formed on the support device, which lies against a shoulder of the housing whilst the housing is lifted from the measurement surface. This arrangement has the advantage that, if necessary, magnetic attraction forces acting between one or several measuring heads and the object can be overcome, without the suspension bracket being overloaded, particularly the spring elements and/or the additional energy storage element.

Figure 2:
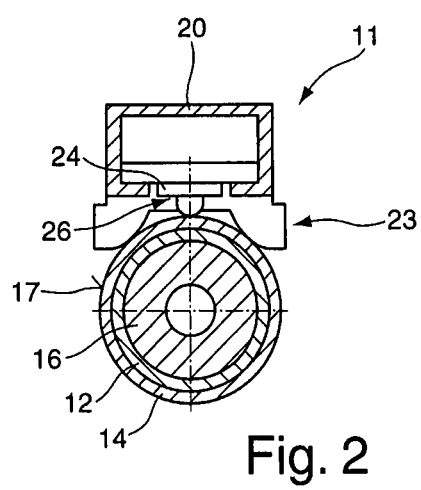
Figure 3:
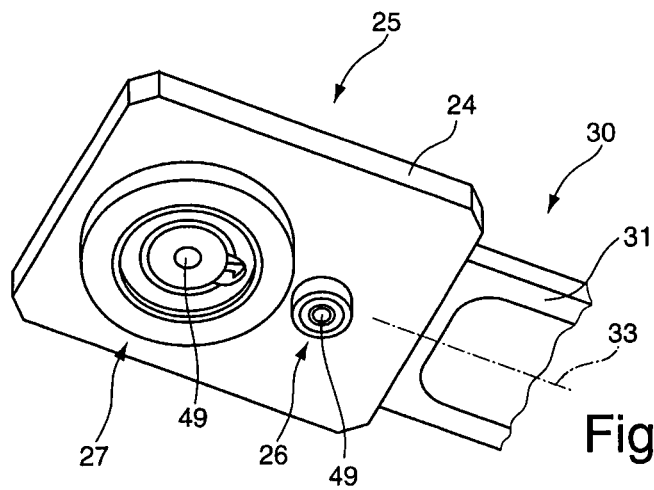
Figure 4:
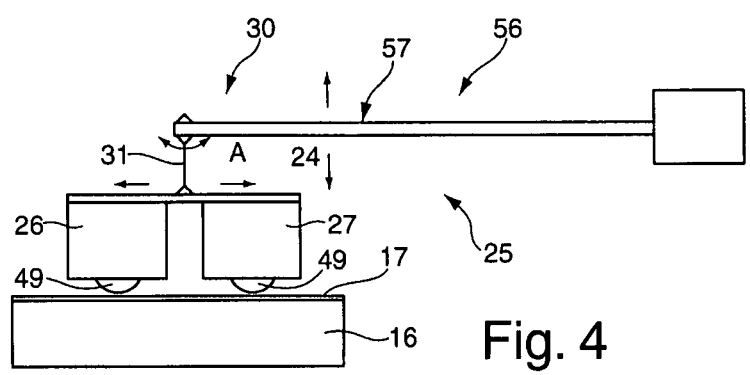
Figure 5:
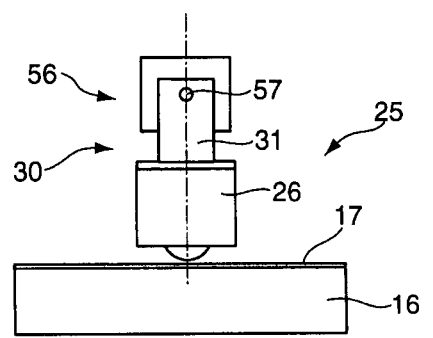
Figure 6:
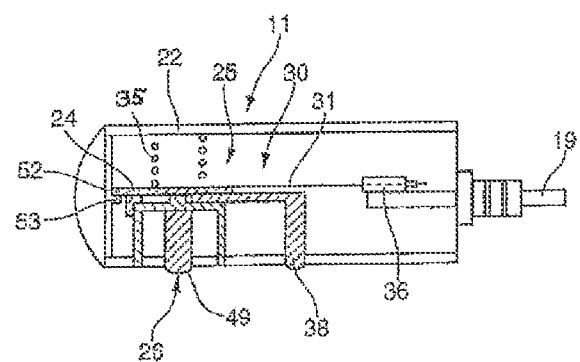
Figure 7:
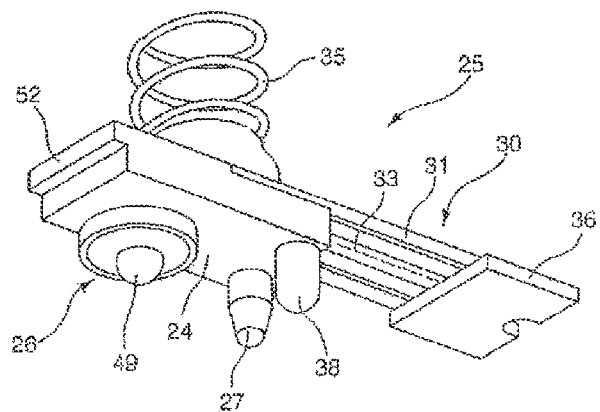
Figure 8:
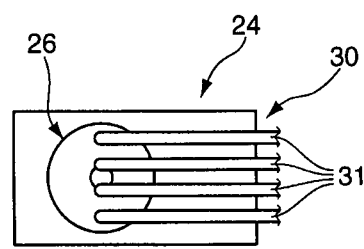
Figure 9:
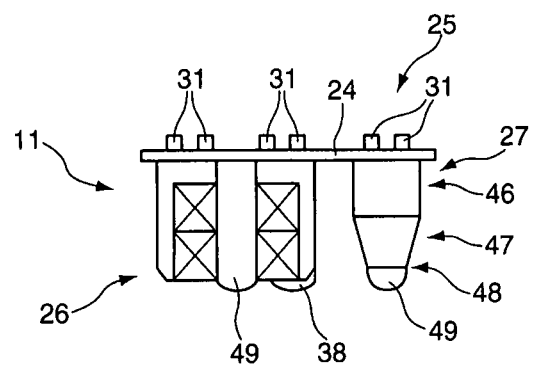

The invention as well as further advantageous embodiments and further developments of the same are subsequently explained in more detail and illustrated by means of the examples shown in the drawings. The features to be taken from the description and the drawings can be used individually or severally in any combination according to the invention. In the drawings:

FIG. 1 shows a schematic side view of a measuring probe according to the invention, FIG. 2 shows a schematic view from the front, in partial sections, of a measuring head according to FIG. 1, FIG. 3 shows a perspective sectional view from below of a support device of the measuring probe according to FIG. 1, FIG. 4 shows a schematic side view of an alternative embodiment of the measuring probe according to FIG. 1, FIG. 5 shows a schematic front view of the measuring probe according to FIG. 4, FIG. 6 shows a schematic sectional representation of an further embodiment, alternative to FIG. 1, FIG. 7 shows a perspective view of a support device with measuring heads according to FIG. 4, FIG. 8 shows a schematic view of the support device according to FIG. 4, FIG. 9 shows a schematic side view of the measuring heads according to FIG. 5, FIGS. 10a and b show a schematic side view and top view of an embodiment of a measuring probe alternative to FIG. 1, FIGS. 11a and b show a schematic side view and perspective view from below of a further measuring probe, alternative to FIG. 6.

A schematic side view of a measuring probe 11 according to the invention is shown in FIG. 1. A further schematic view of the measuring probe 11 is given in FIG. 2. A measuring probe 11 of this type is used for non-destructive measuring of the thickness of thin layers 12, 14 on objects 16. These objects 16 can comprise a level measurement surface, or as shown in the execution example, a curved measurement surface 17. The measuring probe 11 is connected by a connecting line 19 to an evaluation device 20, shown schematically. Alternatively, a cordless data transfer of the detected and recorded measurement values on the measuring probe 11 can be provided on the evaluation device 20.

The measuring probe 11 includes a housing 22, on which a positioning device 23 can either be attached to the housing 22, or is formed as an integral part, depending on the measurement task. In the present execution example, the positioning device 23 is formed as a prism, in order to create a secure positioning on the object 16 with a curved measurement surface 17. Alternatively, other positioning devices can also be provided. For very delicate measurement surfaces 17, the positioning can comprise an additional coating, of plastic or similar, for example.

In the housing 22, a support device 24 is arranged so that it is moveable with at least one degree of freedom, and which accepts a first measuring head 26 and at least a further measuring head 27, spatially separated from each other on the same support device 24. Each of the measuring heads comprise a polar axis 28, 29, which are oriented parallel to each other, and are arranged at a distance from one another. The distance of the polar axes 28, 29 of the measuring heads 26, 27 is, for example, a few millimeters, particularly 3 to 10 mm, whereby in comparison to large scale measurement surfaces 17, punctiform measurement can be taken as the starting point. The first and at least one further measuring head 26, 27 lie on a common line, particularly oriented at right angles to the positioning device 23, so that the measuring heads 26, 27 are oriented along a surface line of the curved measurement surface 17 on the object 16.

The support device 24 is positioned so that it can be deflected to the housing 22 by a mounting suspension 30. In a first embodiment, a strip-like spring element 31, which is formed as a leaf spring element with the appropriate recesses therein, engages at least on the support device 24. The spring element 31 preferably engages at the centre of gravity 32 on the support device 24, whereby the centre of gravity lies between both measuring heads 26 and 27. Through this position of the support device 24, due to the spring element 31, it is possible for not only electrical contacting of the measuring heads 26, 27 to take place, but also that both a deflection movement along the polar axes 28, 29, or a dipping movement of the support device 23 into the housing 22, is made possible, and a pivoting movement about a longitudinal axis 33 of the spring element or spring elements 31 is made possible. In addition, between the housing 22 and the centre of gravity 32, an energy storage element 35 can engage on the support device 24, in order to counteract the dipping movement of the support device 24 during contact of the measuring probe 11 on the object 16, and to ensure a secure arrangement of the measuring heads 26, 27 on the measurement surface 17. The support device 24 with the measuring heads 26, 27 arranged thereon, as well as the mounting suspension 30, and if necessary, the energy storage element 35, form a probe unit 25, which can be removably inserted in the housing.

The support device 24 can preferably be formed as a support plate or as a circuit board, so that the electrical connections between the measuring heads 26, 27 and the circuit board can be facilitated in a simple way. Simultaneously, corresponding contact points for connection of the spring element or elements 31 can be provided, which are designed be electrically conductive, as will be subsequently described.

The support device 24, with both measuring heads 26, 27 arranged thereon, forms a so-called two-point support. This arrangement, as well as the spring elements 31 arranged thereon, and if necessary, the energy storage device 35 can be inserted in the housing 22 or can be removably arranged therein. A connection element 36 is preferably provided for this, in order to connect to the other signal lines, which are not shown in detail.

A measuring probe 11 of this type is preferably used for investigating a multiple coating. For example, coatings on a platen for offset machines can be checked with a probe 11 of this type. The platen forms the object 16, which consists of an iron-based material, for example. A first layer 12, for example, a copper layer, is applied to this iron-based material. A further layer 14, for example, a chrome layer, is applied to this copper layer. In order to carry out this measuring and checking of the required thickness of the layers 12, 14, it is intended that the first measuring head 26 comprises a sensor element, for example, for measuring the layer thickness according to the eddy current method, and the at least one further measuring head 27 determines a sensor element for measuring the layer thickness according to the DC field method. This means that the first measuring head measures the layer thickness 14 by eddy currents being induced in the copper layer, which is saturation thick, via the high frequency alternating magnetic field, whose secondary magnetic field weakens the primary high frequency magnetic field, so that the distance of the measuring head 26, lying on the measurement surface 12, to the layer 12 is detected due to the weakening. The thickness of the layer 12 is determined by the other measuring head 27, which includes a Hall probe as a sensor element, which detects the distance between the measurement surface 12 and the base material of the object 16, by means of calculating the difference of the detected thickness of the layer 14 and the distance from the measurement surface 17 to the base material. Due to the residual positioning of the measuring probe 11 on the measurement object 16 whilst the measuring is being carried out, and the defined distance of both measuring heads 26, 27 from one another, an exact differential measurement can be carried out by a differential measurement of this type, in order for example to record and check two layer thicknesses on an object. Alternatively, it can be intended that one of both measuring heads 26, 27 also includes a sensor element, in order to measure a layer thickness according to a magnetic inductive process. These different measuring heads 26, 27 can be arranged in the support device 24 depending on the measurement task.

Measuring of this type is preferably carried out by a sequential control of the measuring heads 26, 27. Therefore, optimisation of the respective measurement processes in addition to the optimised design of the respective measuring heads 26, 27 can be facilitated by the separated arrangement.

A further alternative embodiment of the measuring probe 11 is shown in FIGS. 4 and 5. This measuring probe 11 differs from the embodiment according to FIGS. 1 to 3 in the type of configuration of the mounting suspension 30. In this embodiment, a mounting suspension 30 is provided for the probe unit 25, which is designed as a cardanic device 56. This cardanic device 56 consists of a support bar 57, which is preferably designed as a thin bar, extending longitudinally, and can be deflected in and against a direction of contact of the measuring heads 26, 27, preferably along the polar axes 28, 29. In the process, the support bar 57 can preferably be formed as a round bar. Equally, a square bar 57 or a profiled support bar 57 can also be formed, which can be deflected in and against the direction of contact of the measuring heads 26, 27, but, however, is preferably only twistable to a small extent, or is very firm against torsion. On the free end of the support bar 57, at least one spring element 31 is preferably arranged, which is formed in particular at right angles to the longitudinal axis of the support bar 57. The support device 24 is attached at the opposite end of the spring element 31. According to a first embodiment, the spring element 31, as shown particularly in FIG. 5, is formed as a leaf-like spring element 31, on which conducting paths are preferably arranged. The signal lines are preferably guided along the support bar 57 up to the spring element 31. Alternatively, this spring element 31 can be formed as a flexible circuit board. Furthermore, it is possible that the signal lines have no mechanical connection to the measuring heads 26, 27 due to this embodiment. This also applies for further analogous execution examples. Through this, pivotability of the measuring heads 26, 27 relative to the support bar is facilitated according to arrow A. This ensures that even in the case of initially incorrect contact of the measuring probe 11 on the measurement surface 17, independent orientation of the measuring heads 26, 27 takes place.

Furthermore, alternatively, a spring element 31 can be provided between the support bar 57 and the support device 24, in analogy to FIGS. 1 to 3, or an arrangement according to the execution example subsequently described, according to FIGS. 4 and 8, in which several strip-like spring elements 31 are arranged, which are positioned in a level next to one another, for example. This cardanic device 56 is particularly used in the case of a measuring probe 11 which includes two measuring heads 26, 27, and which form a two-point support, which is used, for example, by a measuring insert, such as in the embodiment according to FIGS. 1 to 3. Both this embodiment according to FIGS. 4 and 5 and the embodiment according to FIGS. 1 to 3 can be used for level or slightly curved surfaces.

In addition, an energy storage element 35 can be provided in the embodiment according to FIGS. 4 and 5. In the embodiment according to FIGS. 4 and 5, the probe unit 25 is shown simply without the other components of the measuring probe 11. These can correspond to the embodiment according to FIGS. 1 to 3.

An alternative embodiment of the measuring probe 11 according to FIGS. 1 to 3 is shown in FIGS. 6 to 9. This measuring probe 11 differs particularly in that the support device 24 comprises a first measuring head 26 and a further measuring head 27, as well as an auxiliary pole 38, which are arranged in relation to each other so that they form a three-point support. Additionally, in a different way, the mounting suspension 30 consists of several strip-like individual spring elements 31, which are arranged in a level and at a distance from each other. These individual strip-like spring elements 31 can be pivoted about a common axis 33, since one end of the spring elements 31 is preferably arranged in the centre of gravity 32 of the support device 24, and the opposite-facing end of the spring elements 31 is arranged on the connecting element 36. Spring elements 31 of this type are preferably electrically conductive, and are formed from copper-beryllium, for example, or similar.

These spring elements 31, as well as that in the first execution example, have a spring function in addition to a guide function. The probe unit 25 is thus positioned in an elastically yielding manner along the polar axes 28, 29 by the mounting suspension 30, particularly spring elements 31. A rotational movement in relation to the longitudinal axis 33 is also possible. Through this, during contact of the probe unit 25 on the measurement surface 17, defined and stable contact of the measurement heads 26, 27 on the surface to be measured can be ensured. At the same time, an independent orientation takes place to rest the measuring heads 26, 27 and the auxiliary pole 38.

These strip-like spring elements 31 according to the embodiment in FIGS. 6 to 9 work in a frictionless way, similar to a spring element according to FIGS. 1 to 3, and facilitate a tumbling of the support device 24 relative to the housing 22 or the positioning device 23, so that a specific position of the measuring heads 26, 27 is assumed in contact of the probe unit 25 by the three-point support. This gives the same advantages whilst measurements of the layer thickness are being carried out, as in the above-described two-point support of the probe unit 25 according to the embodiment in FIGS. 1 to 3. In the execution example according to FIGS. 6 to 9, the probe unit 25 includes a first measuring head 26, which comprises a sensor element, for example a coil on a cup core, which is provided for magnetic inductive measuring of the layer thickness. Furthermore, the other measuring head 27 contains a sensor element, for example, for measuring the thickness of the layers 12, 14 according to a DC field process, which includes a permanent magnet 46, which is provided on a field concentrator 47 near to a hall sensor 48. This hall sensor 48 lies directly behind a contact spherical cap 49.

For safe removal of the probe unit 25, together with the housing 22 of the measuring probe 11, a stop 52 is provided on the supporting plate 24, which lies against a shoulder 53 during the lifting motion of the housing 22. In this way, a magnetic force acting between the measuring head or heads and the object 16 can be overcome if necessary, and overburdening the mounting suspension 30 can be avoided.

Figure 10A:
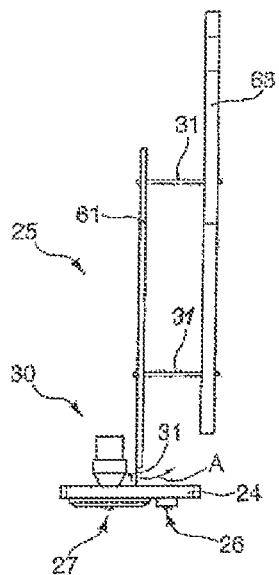

In FIGS. 10*a* and *b*, a further alternative embodiment for a mounting suspension 30 of the probe unit 25 is shown, which is particularly used for a measuring probe 11 with a two-point support. This two-point support is formed by two measuring heads 26, 27, which are arranged on the support device 24. The support device 24 is connected to a coupling element 61 by at least one, preferably two, spring elements 31 which are oriented in parallel and at a distance from one another, with the spring elements 31 and the coupling element 61 being oriented in parallel to the polar axes 28, 29 of the measuring heads 26, 27. At right angles thereto, at least two leaf-like spring elements 31 are provided, arranged at a distance from one another, which are connected to a housing plate 63, which constitutes part of the housing 22, so that during a contact movement, the coupling element 61 is displaced in parallel, relative to the housing plate 63, or is moved up and down, and the leaf-like spring elements 31 provide a sliding movement, in a parallelogram-like manner, of the coupling element 61 relative to the housing plate 63. The spring elements 31 arranged between the coupling element 61 and the support device 24 in turn facilitate a pivoting movement of the support device 24 according to arrow A. This arrangement and orientation is particularly advantageous when using two measuring heads 26, 27 without an auxiliary pole 33 on a support device 24.

Figure 10B:
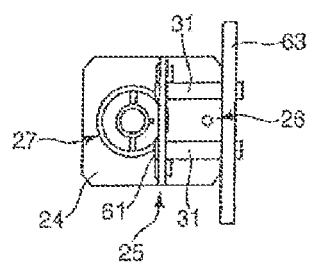
Figure 11B:
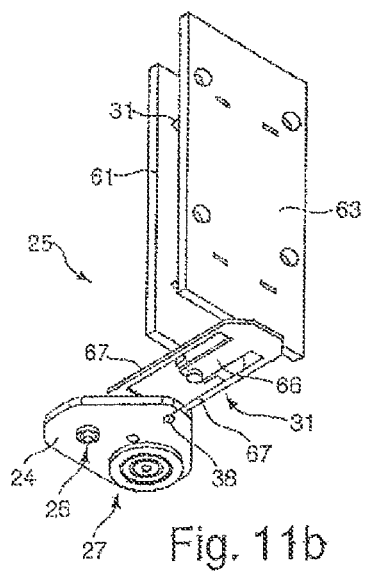

As can be seen from the top view in FIG. 10*b*, the parallelogram guide of the coupling element 61 to the housing plate 63 is made by four leaf-like spring elements 31 in total. Exact guiding of the support device 24, and thus the measuring heads 26, 27 arranged thereon, is facilitated in order to guard against tipping.

Figure 11A:
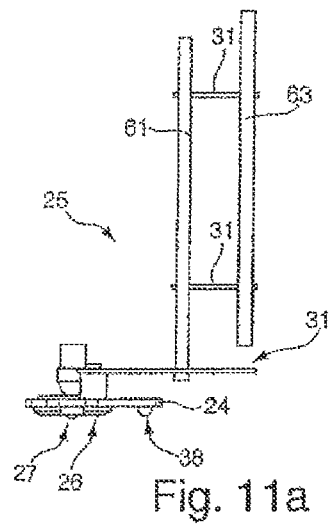

An embodiment of the mounting suspension 30 alternative to FIGS. 10*a* and *b* is shown in FIGS. 11*a* and *b*. This alternative mounting suspension 30 of the probe unit 25 is particularly provided for a measuring probe 11 with a three-point support, in which the support device 24 includes two measuring heads 26, 27 and an auxiliary pole 38. The arrangement and acceptance of the coupling element 61 in the housing plate 63 is the same as the embodiment according to FIGS. 10*a* and *b*. However, the connection of the support device 24 to the coupling element 61 differs from this. Instead of a spring element 31 which is oriented perpendicularly to the support device 24, or several spring elements 31 according to the FIGS. 10*a* and *b*, in this embodiment the spring element or spring elements 31 are oriented parallel to the support device 24, or at right angles to the coupling element 61.

In principle, the spring element 31 corresponds to the spring element 31 according to FIG. 3, with a further additional tongue 66 being provided in this embodiment, in order to lengthen the portions 67 of the spring element 31, so that a deflection is produced not only in the direction of contact, but that a twisting about the longitudinal axis, and thus a tumbling movement of the support device 24 relative to contact of the measuring heads 26, 27 and the auxiliary pole 38 in the correct position, is also produced simultaneously. The tongue 66 extends into the recess, which is introduced in the leaf-like spring element 31. This mounting suspension 30 shown in FIGS. 11*a* and *b* can also be used for a support device 24 with a two-point support.

The energy supply can also take place in the embodiments according to FIGS. 10*a* and *b*, as well as FIGS. 11*a* and *b*, by means of the spring elements 31, whereby these are accordingly provided with conducting paths or etched conducting paths.

In the aforementioned probe units 25, in principle, all measuring heads can be used for tactile measuring of the thickness of thin layers, which can be selected according to the single or multiple layer/base material combination.

The invention claimed is:

1. Measuring probe for non-destructive measuring of the thickness of thin layers on an object, the measuring probe comprising:
   a first measuring head for non-destructive measuring of the thickness of thin layers on an object, the first measuring head comprising at least one sensor element for contact on a measurement surface of an object,
   at least one additional measuring head for contact on the measurement surface of the object for non-destructive measuring of the thickness of thin layers on an object,
   a support device, the support device being a single member receiving both the first measuring head and the at least one additional measuring head,
   the first measuring head and the at least one additional measuring head both being arranged on the support device adjacent to and separate from each other,
   the first measuring head and the at least one additional measuring head having different positions and the first measuring head and the at least one additional measuring head being electrically controlled independently of one another,
   a housing, the housing at least partly surrounding the support device, the first measuring head and the at least one additional measuring head,
   a mounting suspension between the support device and the housing,
   the mounting suspension comprising at least one spring element configured for a deflecting movement of the support device into the housing and for a pivoting movement of the first measuring head and the at least one additional measuring head about a longitudinal axis of the at least one spring element.

2. Measuring probe according to claim 1, wherein the measuring heads comprise polar axes in each case, which are arranged spatially separated from each other, and are oriented parallel to each other.

3. Measuring probe according to claim 1, wherein at least the first measuring head determines at least one sensor element for measuring the layer thickness according to a magnetic induction process, eddy current method, phase-sensitive process or magnetic DC field process, and the at least one additional measuring head determines at least one sensor element for measuring the layer thickness according to a magnetic induction process, eddy current method, phase-sensitive process or magnetic DC field process.

4. Measuring probe according to claim 1, wherein at least two measuring heads are arranged one behind the other in a line on the support device, and the mounting suspension engages on the support device at the centre of gravity of the two-point support formed by the measuring heads.

5. Measuring probe according to claim 1, wherein two measuring heads and an auxiliary pole are provided on the support device, which form a three-point support, and the mounting suspension preferably engages on the support device at the centre of gravity of the three point support.

6. Measuring probe according to claim 4, wherein at least one positioning device for contact and orientation of the housing relative to the object is provided on one housing which receives the support device.

7. Measuring probe according to claim 4, wherein the at least two measuring heads arranged in a line are oriented along a surface line of the curved measuring surface of the object during measurement of curved measurement surfaces.

8. Measuring probe according to claim 1, wherein the mounting suspension, which connects the support device to the housing, is formed as a ball joint.

9. Measuring probe according to claim 1, wherein the mounting suspension, which connects the support device to the housing, is formed by a spring element or by several strip-like spring elements, arranged next to one another, which engage on the support device, and are attached to the housing on the opposite side by a connecting element.

10. Measuring probe according to claim 9, wherein a spring element is formed like a leaf-spring, as well as that the measuring heads are oriented with their polar axes standing perpendicularly to the level of the spring element, and that several electrical conducting paths are provided on the spring element in particular.

11. Measuring probe according to claim 9, wherein the spring elements are arranged in a common level next to one another, and are arranged at a distance from one another, as well as that the measuring heads are oriented with their polar axes standing perpendicularly to the level of the spring elements.

12. Measuring probe according to claim 11, wherein the spring elements are arranged in a common level next to one another, and are arranged at a distance from one another and engage together on the support device in the region of the centre of gravity.

13. Measuring probe according to claim 1, wherein the mounting suspension, which connects the support device to the housing, is formed by a cardanic device.

14. Measuring probe according to claim 13, wherein the cardanic device consists of a support bar, which is connected to the housing, and which is deflectable in the direction of contact of the measuring heads, and one or several spring elements, which are arranged on the free end of the support bar, which receive the support device.

15. Measuring probe according to claim 13, wherein the spring element or spring elements receive the support device pivotally about an axis at right angles to the longitudinal extension of the support bar for secure contact of the at least two measuring heads.

16. Measuring probe according to claim 15, wherein the spring elements are designed to be electrically conductive, and are made of copper-beryllium in particular.

17. Measuring probe according to claim 1, wherein the mounting suspension, which connects the support device to the housing, is formed by at least one spring element between the support device and a coupling element, and that the coupling element is oriented at right angles to the support plate, and that at least two spring elements, which are arranged at a distance from each other, and oriented in parallel, carry the coupling element in such a way that it is deflected relative to the housing or a housing plate.

18. Measuring probe according to claim 17, wherein the at least one spring element between the support device and the coupling element is oriented at right angles to or parallel to the support device, and is attached thereto.

19. Measuring probe according to claim 10, wherein the support device is insertable in the housing, removably, and that the spring elements are arranged on the housing in such a way that they are freely guided out.

20. Measuring probe according to claim 1, wherein the at least two measuring heads are controlled sequentially whilst maintaining their contact position relative to the measurement surface on the object.

21. Measuring probe according to claim 1, wherein a stop is formed on the support device, which lies against a shoulder on the housing whilst the housing is lifted from the measurement surface.

\* \* \* \* \*